(12) United States Patent
Wang et al.

(10) Patent No.: US 11,579,652 B2
(45) Date of Patent: Feb. 14, 2023

(54) TERMINAL WITH A SLIDING STRUCTURE DISPOSED BETWEEN FIRST AND SECOND SLIDING COVERS

(71) Applicant: Honor Device Co., Ltd., Guangdong (CN)

(72) Inventors: Zhao Wang, Beijing (CN); Jinfeng Zhou, Shenzhen (CN); Jialin Zhu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 167 days.

(21) Appl. No.: 17/259,038

(22) PCT Filed: Jul. 9, 2018

(86) PCT No.: PCT/CN2018/095044
§ 371 (c)(1),
(2) Date: Jan. 8, 2021

(87) PCT Pub. No.: WO2020/010496
PCT Pub. Date: Jan. 16, 2020

(65) Prior Publication Data
US 2021/0267074 A1    Aug. 26, 2021

(51) Int. Cl.
*G06F 1/16* (2006.01)
*H04M 1/02* (2006.01)

(52) U.S. Cl.
CPC ......... *G06F 1/1624* (2013.01); *H04M 1/0237* (2013.01)

(58) Field of Classification Search
CPC .......................... H04M 1/0237; G06F 1/1624
See application file for complete search history.

(56) References Cited

U.S. PATENT DOCUMENTS

| 8,199,478 B2 * | 6/2012 | Liang ........................ A61P 7/02 361/679.55 |
| 8,340,734 B2 | 12/2012 | Peng |
| 8,475,047 B2 * | 7/2013 | Chang ................. H04M 1/0237 455/575.4 |
| 2007/0204431 A1 | 9/2007 | Oyj |
| 2008/0134469 A1 | 6/2008 | Zhang et al. |
| 2009/0082074 A1 * | 3/2009 | Chen ................... H04M 1/0237 455/575.4 |
| 2009/0156275 A1 | 6/2009 | Park et al. |

(Continued)

FOREIGN PATENT DOCUMENTS

| CN | 101030985 A | 9/2007 |
| CN | 101272410 A | 9/2008 |

(Continued)

*Primary Examiner* — James Wu
(74) *Attorney, Agent, or Firm* — Conley Rose, P.C.

(57) ABSTRACT

A terminal includes a first sliding cover and a second sliding cover disposed opposite to each other, and a sliding structure disposed between the first sliding cover and the second sliding cover. The sliding structure includes a first substrate and a second substrate that can slide relative to each other in a sliding direction, a first groove is provided on a first side of the first substrate, a second groove is provided on a second side opposite to the first side, a first spring is disposed at an opening of the first groove, and a second spring is disposed at an opening of the second groove.

20 Claims, 10 Drawing Sheets

(56) References Cited

U.S. PATENT DOCUMENTS

2009/0262486 A1    10/2009   Shi et al.
2011/0244923 A1    10/2011   Shen
2012/0111713 A1     5/2012   Sakurai et al.

FOREIGN PATENT DOCUMENTS

| CN | 201114194 Y | 9/2008 |
| CN | 101394431 A | 3/2009 |
| CN | 101754621 A | 6/2010 |
| CN | 201623934 U | 11/2010 |
| CN | 101932217 A | 12/2010 |
| CN | 102026513 A | 4/2011 |
| CN | 102209446 A | 10/2011 |

\* cited by examiner

TERMINAL WITH A SLIDING STRUCTURE DISPOSED BETWEEN FIRST AND SECOND SLIDING COVERS

CROSS-REFERENCE TO RELATED APPLICATIONS

This application is a U.S. National Stage of International Patent Application No. PCT/CN2018/095044 filed on Jul. 9, 2018, which is hereby incorporated by reference in its entirety.

TECHNICAL FIELD

Embodiments of this application relate to the field of terminal technologies, and in particular, to a terminal.

BACKGROUND

A slide is a movable mechanical member that is widely used, and enables a device to be opened and folded. In a conventional slide phone, a process in which an upper sliding cover and a lower sliding cover slide relative to each other is generally implemented also by disposing a sliding structure.

FIG. 1 is a schematic diagram of an existing slide phone. As shown in FIG. 1, a sliding structure is disposed between an upper sliding cover 120 and a lower sliding cover 140 of the phone, and the upper sliding cover 120 and the lower sliding cover 140 can slide relative to each other by using the sliding structure. When the upper sliding cover 120 and the lower sliding cover 140 are slidably opened, a keyboard may be exposed for usage by a user.

As shown in FIG. 2, the sliding structure generally includes an upper sliding plate 201 fastened to the upper sliding cover 120, a lower sliding plate 202 fastened to the lower sliding cover 140, and a boost spring (not shown in FIG. 2) disposed between the upper sliding plate 201 and the lower sliding plate 202. Although the boost spring can make a sliding process of the sliding structure smoother, the presence of the boost spring increases a thickness and a weight of the entire sliding structure and makes production and assembly of the sliding structure more complex.

SUMMARY

Embodiments of this application provide a terminal, to reduce a thickness and a weight of a sliding structure in the terminal and simplify a production and assembly process of the sliding structure.

To achieve the foregoing objective, the following technical solutions are used in the embodiments of this application:

According to a first aspect, an embodiment of this application provides a terminal, including a first sliding cover and a second sliding cover disposed opposite to each other, and a sliding structure disposed between the first sliding cover and the second sliding cover. The sliding structure includes a first substrate and a second substrate that can slide relative to each other in a sliding direction, a first groove is provided on a first side of the first substrate, a second groove is provided on a second side opposite to the first side, the first side and the second side are parallel to the sliding direction, a first spring is disposed at an opening of the first groove, and a second spring is disposed at an opening of the second groove. The second substrate is fastened to a housing of the second sliding cover, the housing includes a first surface opposite to the first side and a second surface opposite to the second side, two first limiting grooves are disposed on the first surface in the sliding direction, two second limiting grooves are disposed on the second surface in the sliding direction, and the two first limiting grooves are in a one-to-one correspondence with the two second limiting grooves.

In this way, the first spring and the second spring are disposed on the two sides of the first substrate, so that when the first substrate and the second substrate slide relative to each other, the first spring and the second spring may be driven to be separately in contact with the housing and then generate elastic deformation. An elastic force generated after the first spring and the second spring are deformed can ensure that the first substrate and the second substrate do not slide randomly in an entire sliding process, thereby making the entire slide terminal more stable.

In addition, the first limiting groove and the second limiting groove on the housing further perform a limiting function in the sliding process. In this way, no additional boost spring or limiting structure needs to be disposed between the first substrate and the second substrate, so that a thickness and a weight of the entire terminal can be reduced, and a production process and an assembly process of the terminal also correspondingly become less difficult.

In a possible design method, when the first substrate and the second substrate slide relative to each other, the first spring is in contact with the first surface between the two first limiting grooves and generates elastic deformation, and the second spring is in contact with the second surface between the two second limiting grooves and generates elastic deformation. An elastic force generated after the first spring and the second spring are deformed can ensure that the first substrate and the second substrate do not slide randomly in the entire sliding process.

In a possible design method, the first spring includes a first elastic component, the first elastic component generates elastic deformation when receiving an action force directed at the second side, the second spring includes a second elastic component, and the second elastic component generates elastic deformation when receiving an action force directed at the first side.

In a possible design method, the first elastic component is V-shaped or arc-shaped, and the second elastic component is V-shaped or arc-shaped.

In a possible design method, a shape of the first limiting groove corresponds to that of the first spring, and a shape of the second limiting groove corresponds to that of the second spring, so that the first spring may be fastened in the first limiting groove, and the second spring may be fastened in the second limiting groove, to perform a limiting function in the sliding process.

In a possible design method, in an initial state, the first spring is fastened in one first limiting groove, and the second spring is fastened in a corresponding second limiting groove.

After the first substrate drives the first spring to slide out of the first limiting groove and drives the second spring to slide out of the second limiting groove, the first spring is pressed against the first surface and generates elastic deformation, and the second spring is pressed against the second surface and generates elastic deformation, so that the first substrate is fastened within the housing.

After the first substrate drives the first spring to slide into the other first limiting groove and drives the second spring to slide into the other second limiting groove, the first spring is fastened in the other first limiting groove and recovers from deformation, and the second spring is fastened in the other second limiting groove and recovers from deformation.

In a possible design method, a surface between the two first limiting grooves is a first convex surface, a surface between the two second limiting grooves is a second convex surface, and both the first convex surface and the second convex surface protrude into the first substrate.

In a possible design method, the first convex surface is an arc-shaped surface or a V-shaped surface, and the second convex surface is an arc-shaped surface or a V-shaped surface.

In a possible design method, a vertex of the first convex surface is located on a perpendicular bisector between the two first limiting grooves, and a vertex of the second convex surface is located on a perpendicular bisector between the two second limiting grooves.

In a possible design method, a process in which the first substrate and the second substrate slide relative to each other includes a first phase and a second phase, the first phase includes: the first spring slides from one first limiting groove to the vertex of the first convex surface and the second spring slides from a corresponding second limiting groove to the vertex of the second convex surface, and the second phase includes: the first spring slides from the vertex of the first convex surface to the other first limiting groove and the second spring slides from the vertex of the second convex surface to the other second limiting groove.

In the first phase, elastic deformation generated when the first spring is in contact with the first convex surface becomes larger, and elastic deformation generated when the second spring is in contact with the second convex surface becomes larger, so that a sliding resistance between the first substrate and the second substrate becomes larger.

In the second phase, the elastic deformation generated when the first spring is in contact with the first convex surface gradually recovers, and the elastic deformation generated when the second spring is in contact with the second convex surface gradually recovers, to help the first substrate and the second substrate slide relative to each other.

In other words, when the first substrate and the second substrate slide relative to each other, the first spring and the second spring on the first substrate are first pressed to accumulate an elastic force when the first spring and the second spring are in contact with the first convex surface of the housing, and then release the elastic force to help the first substrate and the second substrate slide relative to each other, so that a user has a better sliding feel when sliding an upper sliding cover and a lower sliding cover of the terminal.

In a possible design method, a thickness of the sliding structure is not greater than 1.2 mm.

In a possible design method, the first sliding cover is the upper sliding cover of the terminal, the second sliding cover is the lower sliding cover of the terminal, the first substrate is fastened to the upper sliding cover, and the second substrate is fastened to the lower sliding cover.

In the embodiments of this application, names of components in the terminal constitute no limitation on devices. In an actual implementation, these components may have other names. The components fall within the scope of the claims of this application and equivalent technologies thereof provided that functions of the components are similar to those in the embodiments of this application.

DESCRIPTION OF EMBODIMENTS

The following terms "first" and "second" are merely intended for descriptive purpose, and shall not be understood as indication or implication of relative importance or implicit indication of a quantity of indicated technical features. Therefore, a feature limited by "first" or "second" may explicitly or implicitly include one or more features. In descriptions in the embodiments of this application, "a plurality of" means two or more unless otherwise described.

A sliding structure provided in an embodiment of this application may be included in a terminal. The sliding structure may be used so that a part of the terminal can slide relative to another part of the terminal. The terminal may be, for example, a mobile phone, a tablet personal computer (TPC), a digital camera, a personal digital assistant (PDA), a navigation apparatus, a mobile Internet device (MID), or a wearable device.

Specifically, a sliding structure provided in an embodiment of this application includes a first substrate and a second substrate that can slide relative to each other. The first substrate may be fastened to a first sliding cover of the terminal, and the second substrate may be fastened to a second sliding cover of the terminal. In this way, when the first substrate and the second substrate slide relative to each other, the first sliding cover and the second sliding cover of the terminal may be driven to slide relative to each other.

In all the following embodiments, an example in which the first sliding cover is an upper sliding cover of the terminal, the second sliding cover is a lower sliding cover of the terminal, the first substrate is an upper substrate of the sliding structure, and the second substrate is a lower substrate of the sliding structure is used for description. In this case, the first substrate is the upper substrate fastened to the upper sliding cover, and the second substrate is the lower substrate fastened to the lower sliding cover. Certainly, the first sliding cover may be alternatively disposed as the lower sliding cover of the terminal, and the second sliding cover may be alternatively disposed as the upper sliding cover of the terminal. This is not limited in the embodiments of this application.

Figure 1:
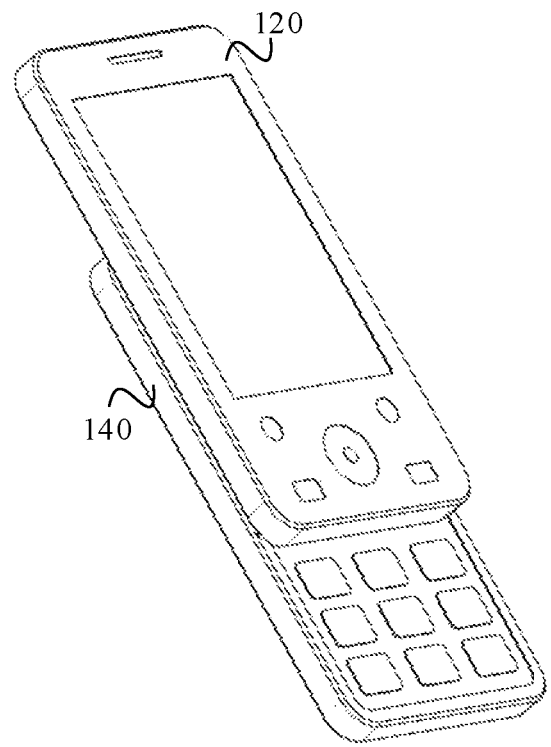
FIG. 1 is a schematic structural diagram of a slide phone in the prior art.
Figure 2:
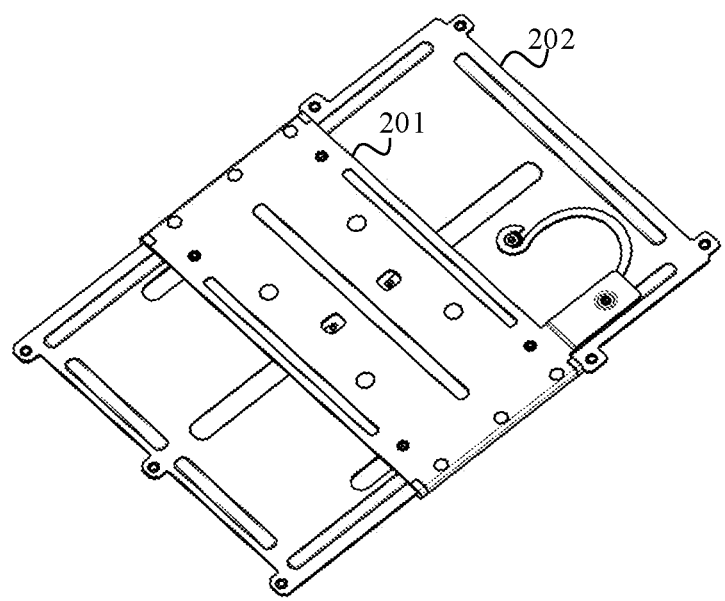
FIG. 2 is a schematic structural diagram of a sliding structure in a slide phone in the prior art.
Figure 3A:
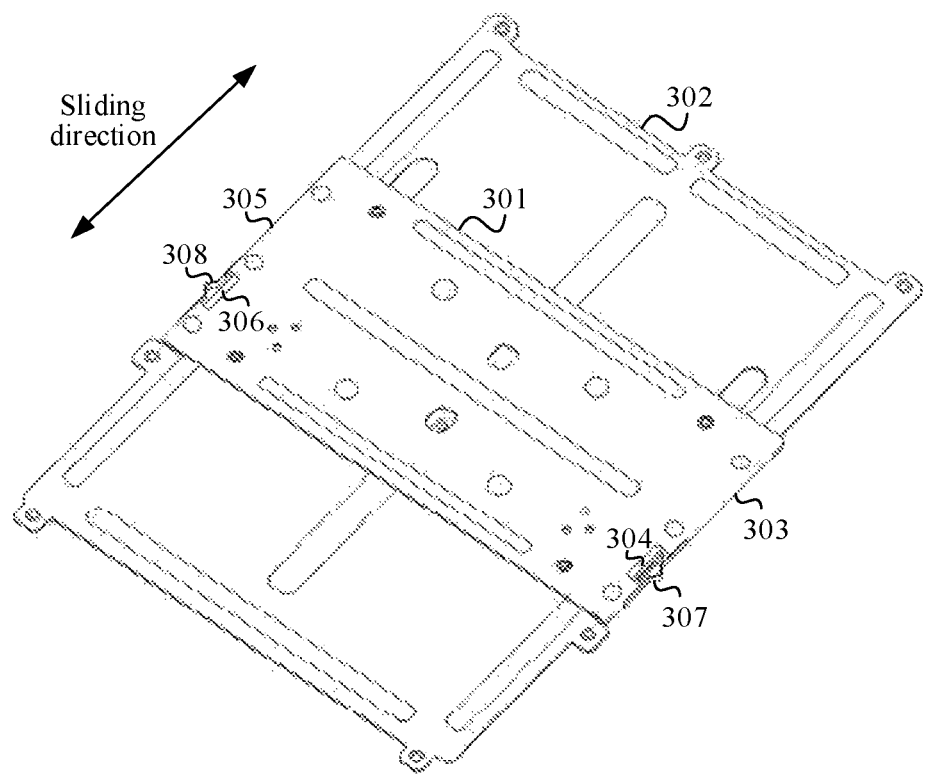
FIG. 3A is a first schematic structural diagram of a sliding structure according to an embodiment of this application.

For example, FIG. 3A is a schematic diagram of a sliding structure according to an embodiment of this application. The sliding structure includes an upper substrate 301 and a lower substrate 302. The upper substrate 301 may be fastened to an upper sliding cover of a terminal, and the lower substrate 302 may be fastened to a lower sliding cover of the terminal.

The upper substrate 301 and the lower substrate 302 can slide relative to each other through cooperation between a slide and a sliding slot. For example, the slide may be disposed on each of two opposite sides of the lower substrate 302. Correspondingly, a sliding slot (for example, an I-shaped sliding slot or an h-shaped sliding slot) may be disposed on each of sides that are of the upper substrate 301 and that separately correspond to the two sides. In this way, after the slides on the lower substrate 302 are separately inserted into the sliding slots on the upper substrate 301, the sliding slots and the slides cooperate with each other so that the upper substrate 301 and the lower substrate 302 can slide relative to each other.

Certainly, the sliding slot may be alternatively disposed on the lower substrate 302, and the slide may be alternatively disposed on the upper substrate 301, so that the upper substrate 301 and the lower substrate 302 slide relative to each other. In a specific implementation process, quantities, positions, and sizes of sliding slots and slides may be selected based on a structure of each component in the terminal. This is not limited in this embodiment of this application.

In this embodiment of this application, still as shown in FIG. 3A, a first groove 304 is disposed on a first side 303 of the upper substrate 301, and a second groove 306 is disposed on a second side 305 opposite to the first side 303. The first side 303 (or the second side 305) is parallel to a sliding direction in which the upper substrate 301 and the lower substrate 302 slide relative to each other.

In addition, a first spring 307 is disposed at an opening of the first groove 304, and a second spring 308 is disposed at an opening of the second groove 306. The spring has the following characteristic: the spring is easy to bend in only one direction (that is, a plane with minimum stiffness), and has relatively large tensile stiffness and bending stiffness in another direction. In this application, both the first spring 307 and the second spring 308 are easy to bend in a direction perpendicular to the sliding direction. For example, after receiving a force directed at the second side 305, an elastic component of the first spring 307 may generate elastic deformation in the direction perpendicular to the sliding direction, and after receiving a force directed at the first side 303, an elastic component of the second spring 308 may also generate elastic deformation in the direction perpendicular to the sliding direction.

Figure 3B:
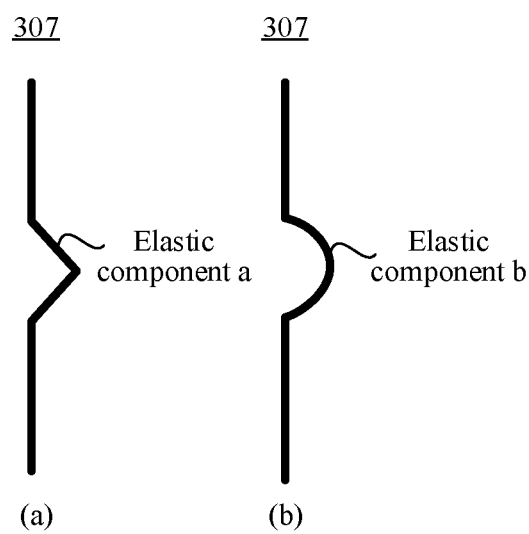
FIG. 3B is a second schematic structural diagram of a sliding structure according to an embodiment of this application.

For example, as shown in (a) in FIG. 3B, the first spring 307 is used as an example, the first spring 307 may include a V-shaped elastic component a, and an opening of the V-shaped elastic component a entirely points into the upper substrate 301. Alternatively, as shown in (b) in FIG. 3B, the elastic component (that is, an elastic component b) of the first spring 307 (or the second spring 308) may be arc-shaped or the like. This is not limited in this embodiment of this application.

When the upper substrate 301 and the lower substrate 302 slide relative to each other, the elastic components of the first spring 307 and the second spring 308 are pressed and generate elastic deformation. In this case, an action force directed at the upper substrate 301 is applied to the first spring 307 and the second spring 308 in a plane in which the upper substrate 301 is located. Under the action force, a process in which the upper substrate 301 slides towards the top or the bottom may be completed. Generally, the bottom refers to a position close to the bottom of the terminal, and the top refers to a position close to the top of the terminal. The bottom and the top of the terminal generally refer to the bottom and the top that exist when the terminal is normally used by a user.

The first spring 307 is used as an example. As shown in (a) in FIG. 4, a first action force F1 directed at the top of the terminal may be applied to the elastic component a of the first spring 307, and the first action force F1 may be divided into a first component F1($x$) on the x-axis and a second component F1($y$) on the y-axis. In response to the first component F1 ($x$), the elastic component a of the first spring 307 generates elastic deformation in the direction perpendicular to the sliding direction, so that the elastic component a accumulates an elastic force. In addition, the second component F1($y$) is directed at the top, thereby helping push the upper substrate 301 to slide towards the top of the terminal.

Figure 4:
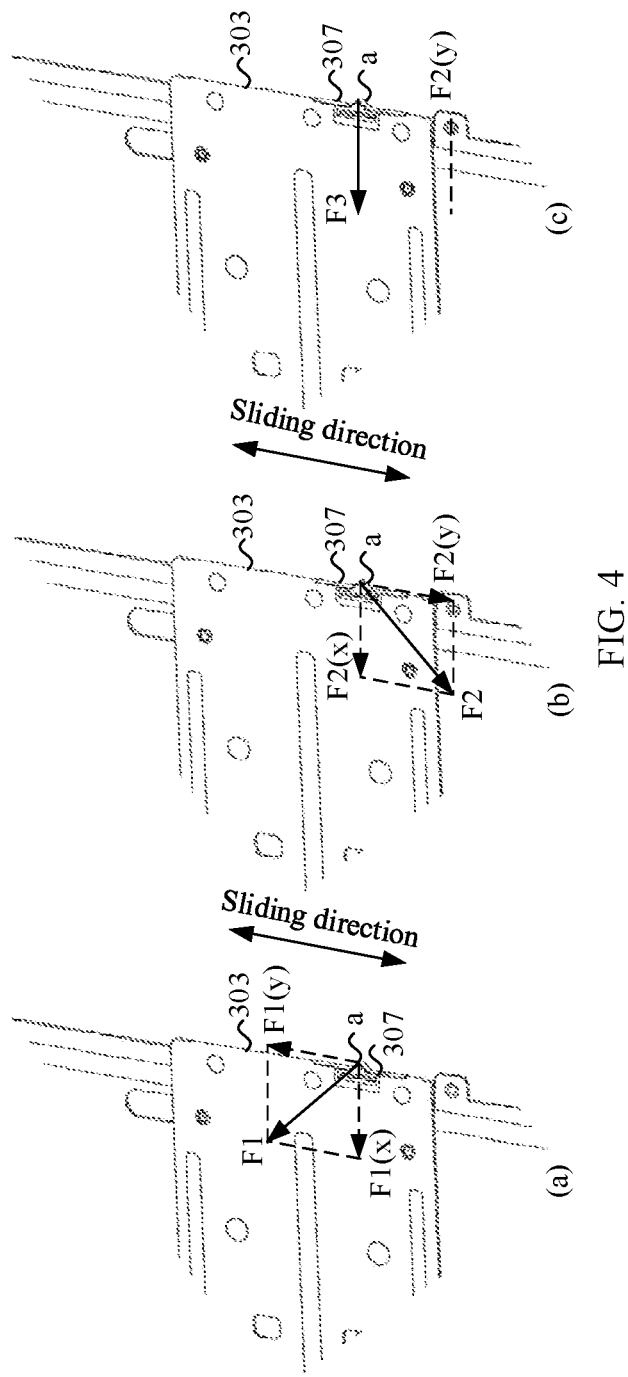
FIG. 4 is a schematic diagram of a principle of a sliding structure according to an embodiment of this application.

Correspondingly, as shown in (b) in FIG. 4, a second action force F2 directed at the bottom of the terminal may be applied to the elastic component a of the first spring 307, and the second action force F2 may be divided into a first component F2($x$) on the x-axis and a second component F2($y$) on the y-axis. In response to the second component F2($x$), the elastic component a of the first spring 307 generates elastic deformation in the direction perpendicular to the sliding direction, so that the elastic component a accumulates an elastic force. In addition, the second component F2($y$) is directed at the bottom, thereby helping push the upper substrate 301 to slide towards the bottom of the terminal.

Alternatively, as shown in (c) in FIG. 4, a third action force F3 perpendicular to the sliding direction (that is, on the x-axis) may be applied to the elastic component a of the first spring 307. In this case, the third action force F3 has no component on the y-axis. In response to the third action force F3 on the x-axis, the elastic component a of the first spring 307 may generate elastic deformation in the direction perpendicular to the sliding direction, so that the elastic component a accumulates an elastic force. Subsequently, when the elastic force accumulated by the elastic component a is released, the released elastic force can push the upper substrate 301 to slide towards the top or the bottom of the terminal.

Figure 5:
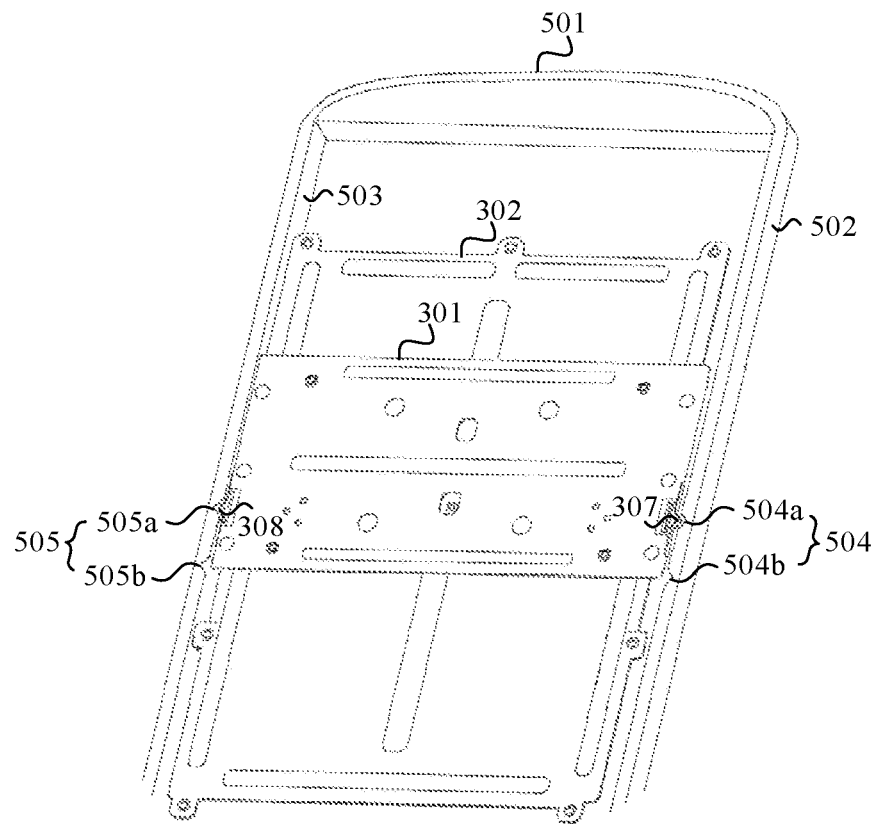
FIG. 5 is a first schematic structural diagram of a terminal according to an embodiment of this application.

In some other embodiments of this application, with reference to the sliding structure shown in FIG. 3A, as shown in FIG. 5, the sliding structure further includes a housing 501 configured to fasten the lower substrate 302. For example, the housing 501 may be a rear cover of the lower sliding cover of the terminal. The housing 501 may enclose each side of the lower substrate 302 and a surface that is of the lower substrate 302 and that is away from the upper substrate 301. After the upper substrate 301 and the lower substrate 302 are assembled, the housing 501 and the lower substrate 302 may be assembled. In this case, a surface that is in the housing 501 and that is opposite to the first side 303 is a first surface 502, and a surface that is in the housing 501 and that is opposite to the second side 305 is a second surface 503.

Two first limiting grooves 504 (for example, a groove 504a and a groove 504b) are disposed on the first surface 502 in the sliding direction, and two second limiting grooves 505 (for example, a groove 505a and a groove 505b) are disposed on the second surface 503 in the sliding direction. A position of each first limiting groove 504 may correspond to that of a second limiting groove 505. A shape of each first limiting groove 504 may correspond to that of the first spring 307, and a shape of each second limiting groove 505 may correspond to that of the second spring 308. A distance between the two first limiting grooves 504 (or the two second limiting grooves 505) is a maximum sliding distance between the upper substrate 301 and the lower substrate 302.

In an initial state, the first spring 307 on the first side 303 is fastened in the first limiting groove (for example, the groove 504a), and the second spring 308 on the second side 305 is fastened in the second limiting groove (for example, the groove 505a) corresponding to the first limiting groove. In this case, neither the first spring 307 nor the second spring 308 generates elastic deformation.

When a user applies, to the upper sliding cover, a force for sliding downwards, the upper sliding cover starts to slide downwards relative to the lower sliding cover. In this case, the upper sliding cover drives the upper substrate 301 to slide towards the groove 504b and the groove 505b relative to the lower substrate 302, to drive the first spring 307 and the second spring 308 to slide out of the groove 504a and the groove 505a.

Figure 6:
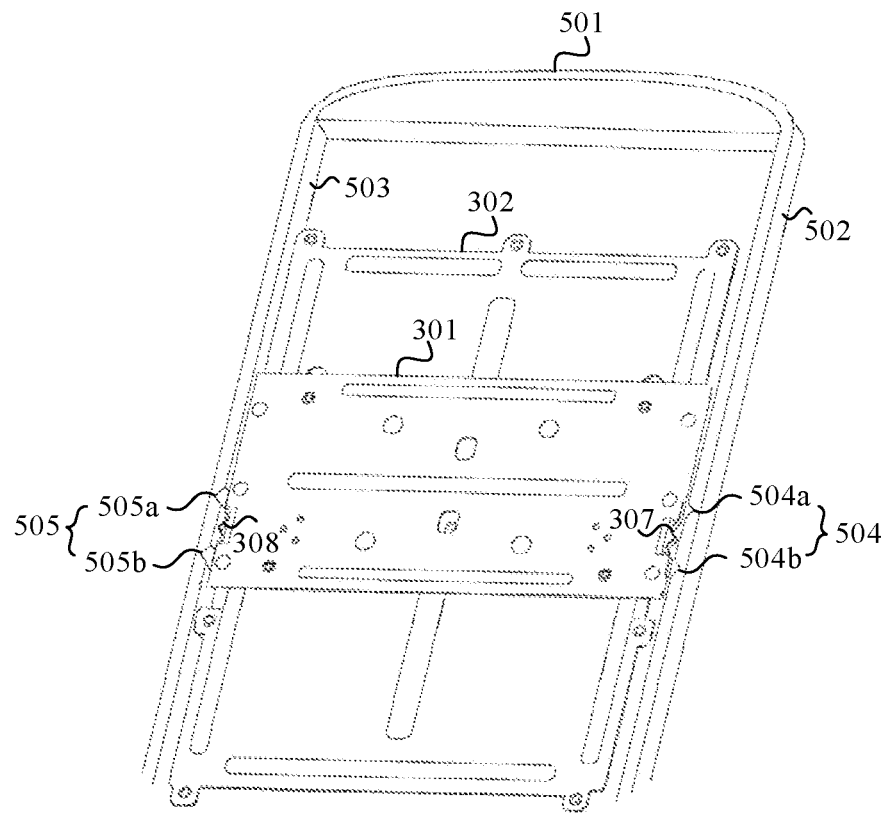
FIG. 6 is a second schematic structural diagram of a terminal according to an embodiment of this application.

In this case, as shown in FIG. 6, after the elastic component of the first spring 307 slides out of the groove 504a, the elastic component of the first spring 307 is pressed against the first surface 502 and generates deformation. With reference to (c) in FIG. 4, after the elastic component of the first spring 307 is pressed against the first surface 502, this is equivalent to applying the third action force F3 to the elastic component of the first spring 307 on the x-axis, so that the elastic component of the first spring 307 generates elastic deformation. To recover from the elastic deformation, the first spring 307 also applies an action force whose direction is opposite to that of the third action force F3 and whose magnitude is the same as that the third action force F3 to the first surface 502. Similarly, still as shown in FIG. 6, after sliding out of the groove 505a, the elastic component of the second spring 308 is also pressed against the second surface 503 and generates deformation. Similarly, two action forces with opposite directions and a same magnitude are also generated on the x-axis. Therefore, when the upper substrate 301 slides towards the bottom, the upper substrate 301 is blocked by the two groups of action forces with opposite directions and a same magnitude that are generated by the first spring 307 and the second spring 308 in the direction (that is, the x-axis) perpendicular to the sliding direction, so that the entire upper substrate 301 can be stably fastened to the lower substrate 302 and does not slide randomly due to gravity, shaking, or the like.

Figure 7:
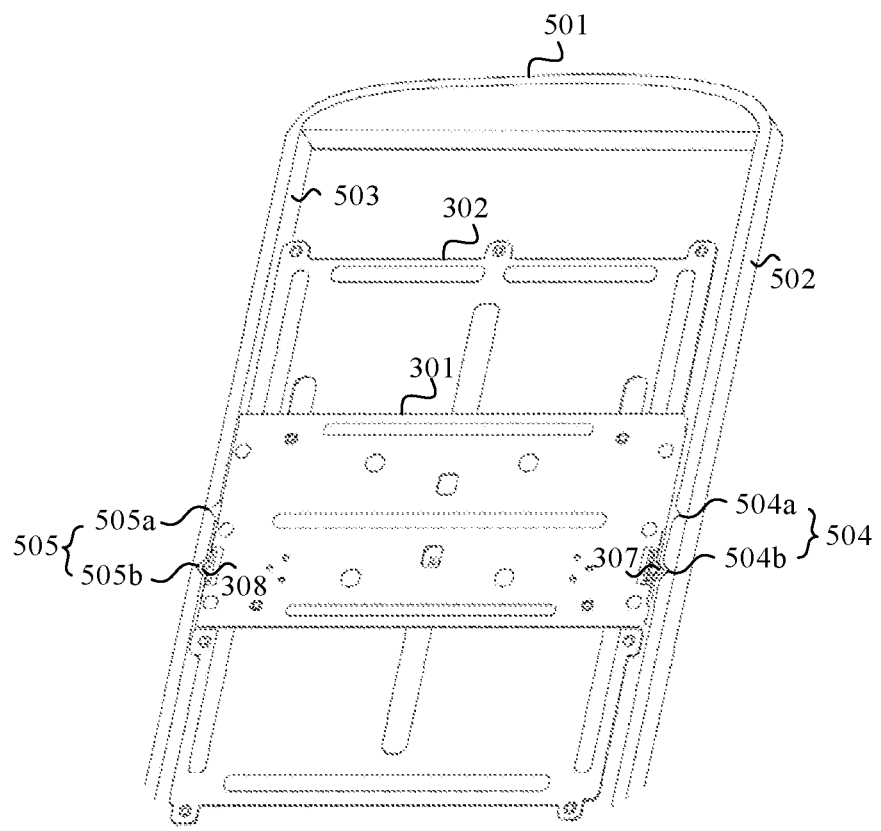
FIG. 7 is a third schematic structural diagram of a terminal according to an embodiment of this application.

Further, as shown in FIG. 7, when the user continues to apply, to the upper substrate 301, an action force for sliding downwards, the upper substrate 301 slides downwards and drives the first spring 307 to slide to the groove 504b and drives the second spring 308 to slide to the groove 505b. In this case, after the elastic force accumulated by the first spring 307 is released, the first spring 307 recovers from the elastic deformation and is fastened in the groove 504b. Similarly, after the elastic force accumulated by the second spring 308 is also released, the second spring 308 recovers from the elastic deformation and is fastened in the groove 505b. In this way, an entire process in which the upper substrate 301 and the lower substrate 302 slide relative to each other is completed.

If the user wants the upper substrate 301 to slide from the groove 504b (or the groove 505b) to the groove 504a (or the groove 505a) relative to the lower substrate 302, the user may apply, to the upper substrate 301, an action force for sliding upwards. In this case, sliding processes of the first spring 307 and the second spring 308 are similar to those shown in FIG. 5 to FIG. 7. Therefore, details are not described herein again. The action force applied by the user to the upper substrate 301 (or the lower substrate 302) may be actually considered as an action force applied by the user to the upper sliding cover or the lower sliding cover of the terminal.

As can be seen, in this embodiment of this application, the first spring 307 and the second spring 308 are disposed on the two sides of the upper substrate 301, so that when the upper substrate 301 and the lower substrate 302 slide relative to each other, each of the first spring 307 and the second spring 308 may be driven to interact with the housing 501, to ensure that the upper substrate 301 and the lower substrate 302 do not slide randomly in an entire sliding process and make the sliding structure more stable. In addition, the first limiting groove and the second limiting groove on the housing 501 further perform a limiting function in the sliding process. In this way, no additional boost spring or limiting structure needs to be disposed between the upper substrate 301 and the lower substrate 302, so that thicknesses and weights of both the entire sliding structure and the entire terminal can be reduced, and a production process and an assembly process of the sliding structure also become less difficult.

Figure 8A:
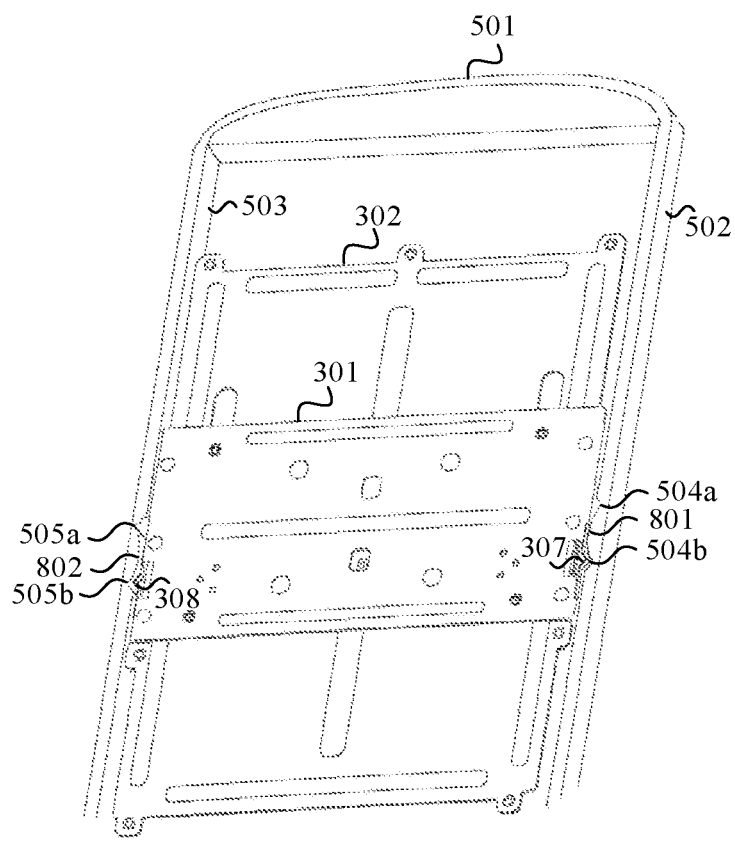
FIG. 8A is a fourth schematic structural diagram of a terminal according to an embodiment of this application.

In some other embodiments of this application, with reference to the sliding structure shown in FIG. 5 to FIG. 7, as shown in FIG. 8A, a surface between the groove 504a and the groove 504b on the first surface 502 may be further disposed as a protruded first convex surface 801. The first convex surface 801 protrudes toward the upper substrate 301 (or the lower substrate 302). Similarly, a second convex surface 802 may be further disposed between the groove 505a and the groove 505b on the second surface 503. The second convex surface 802 also protrudes toward the upper substrate 301 (or the lower substrate 302). For example, a vertex of the first convex surface 801 may be located on a perpendicular bisector between the groove 504a and the groove 504b, and a vertex of the second convex surface 802 may be located on a perpendicular bisector between the groove 505a and the groove 505b.

Figure 8B:
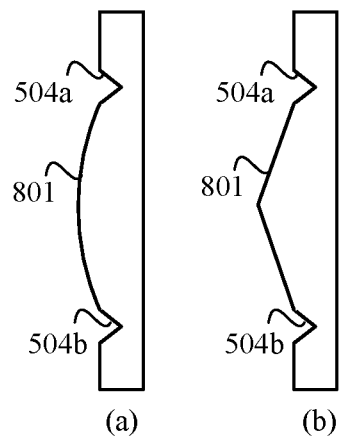
FIG. 8B is a fifth schematic structural diagram of a terminal according to an embodiment of this application.

As shown in FIG. 8B, the first convex surface 801 is used as an example. The first convex surface 801 may be an arc-shaped surface shown in (a) in FIG. 8B. Alternatively, as shown in (b) in FIG. 8B, the first convex surface 801 may be a V-shaped protrusion formed by two planes having specific angles. This is not limited in this embodiment of this application.

When the upper substrate 301 and the lower substrate 302 slide relative to each other, the first spring 307 on the upper substrate 301 is in contact with and pressed against the first convex surface 801, and the second spring 308 on the upper substrate 301 is in contact with and pressed against the second convex surface 802. The entire sliding process of the upper substrate 301 and the lower substrate 302 may be divided into two phases: a first phase of sliding from a limiting groove to a vertex of a convex surface, and a second phase of sliding from the vertex of the convex surface to the other limiting groove.

Figure 9:
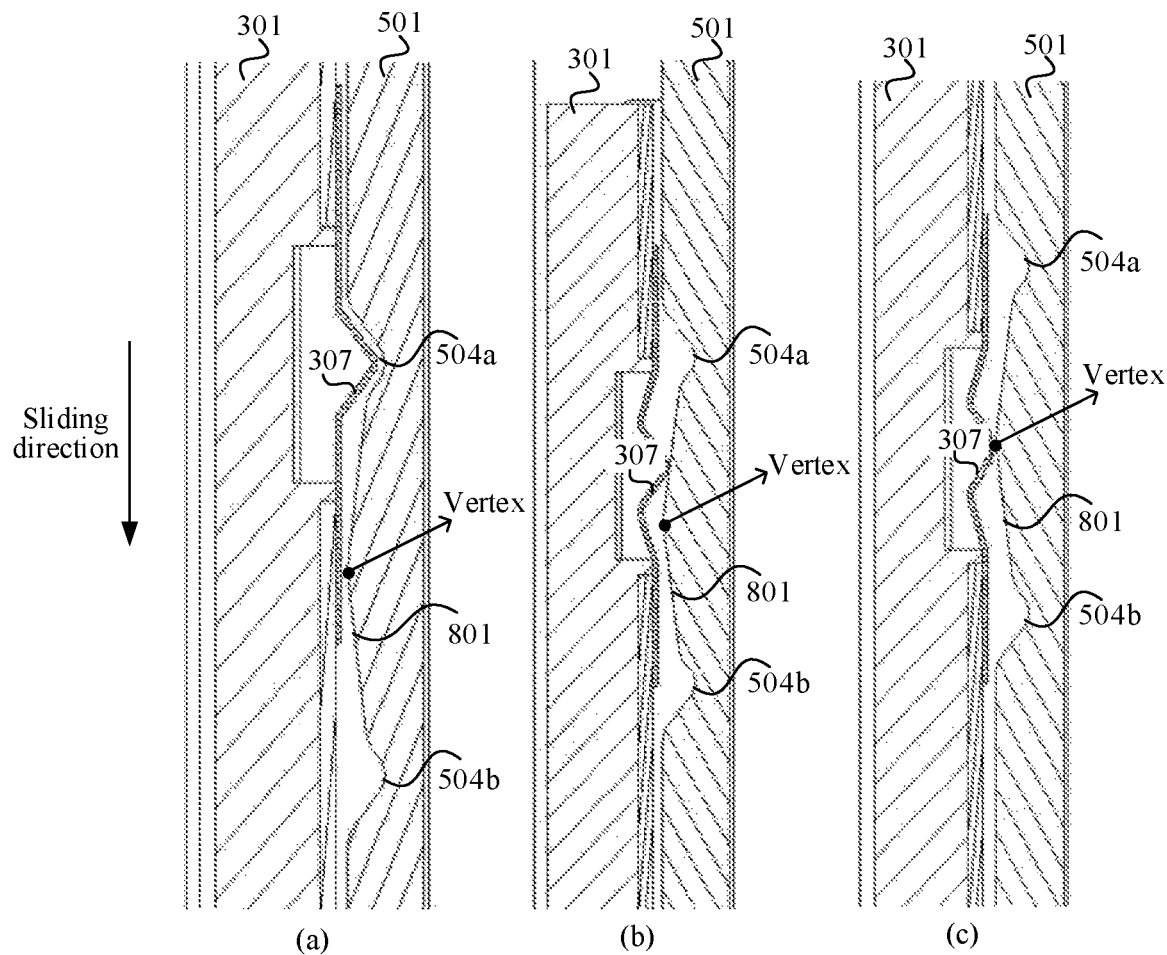
FIG. 9 is a first schematic diagram of a sliding principle of a terminal according to an embodiment of this application.

For example, the upper substrate 301 drives the first spring 307 to slide from the groove 504a to the groove 504b. As shown in (a) in FIG. 9, in an initial state, the first spring 307 on the first side 303 is fastened in the groove 504a. When the user wants the upper substrate 301 to slide towards the bottom relative to the lower substrate 302, a downward action force may be applied to the upper substrate 301. Under the action force, the upper substrate 301 starts to slide towards the bottom, and drives the first spring 307 on the first side 303 to slide out of the groove 504a. As shown in (b) in FIG. 9, after sliding out of the groove 504a, the first spring 307 is in contact with and pressed against the first convex surface 801. In this case, with reference to (a) in FIG. 4, an action force applied by the first convex surface 801 to the elastic component of the first spring 307 is equivalent to the first action force F1, so that the elastic component of the first spring 307 generates elastic deformation. In addition, to recover from deformation, the elastic component of the first spring 307 also applies an action force whose magnitude is the same as that of the first action force F1 and whose direction is opposite to that of the first action force F1 to the first convex surface 801. In this case, in the first phase of sliding to the vertex of the first convex surface 801, because a gap between the first spring 307 and the first convex surface 801 becomes smaller, the elastic component of the first spring 307 is pressed harder and the elastic deformation generated by the elastic component of the first spring 307 also becomes larger. In this case, when the upper substrate 301 slides towards the bottom, the upper substrate 301 is gradually blocked by an elastic force accumulated in the direction (that is, the x axis) perpendicular to the sliding direction, and a resistance becomes larger. The user needs to increase a downward action force applied to the upper substrate 301. As shown in (c) in FIG. 9, under the action force applied by the user, the upper substrate 301 may continue to drive the first spring 307 to slide to the vertex of the first convex surface 801, to complete the first phase of the entire sliding process.

Figure 10:
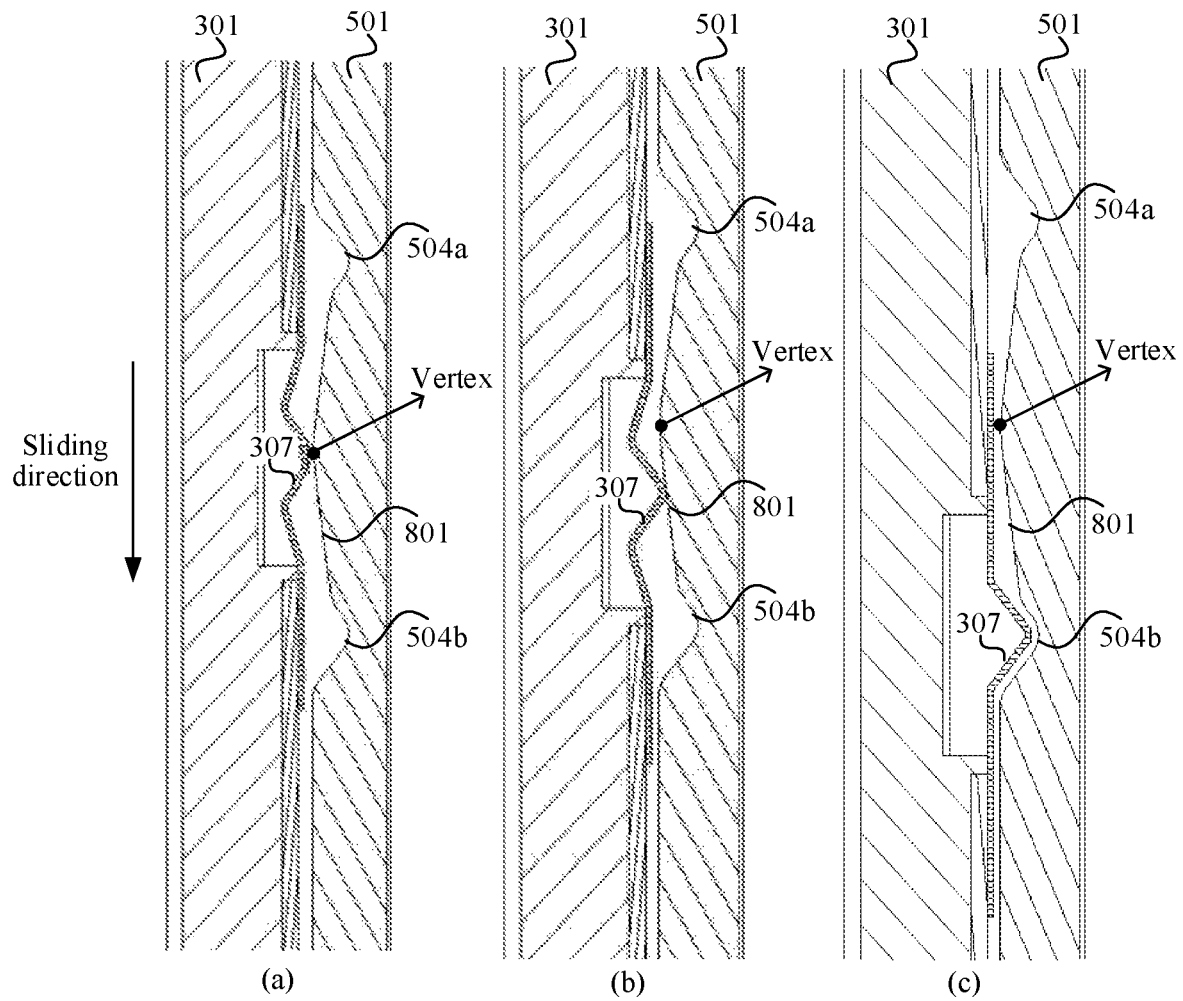
FIG. 10 is a second schematic diagram of a sliding principle of a terminal according to an embodiment of this application.

In the second phase of the sliding process, as shown in (a) and (b) in FIG. 10, when the upper substrate 301 drives the first spring 307 to slide from the vertex of the first convex surface 801 to the groove 504b, as shown in (b) in FIG. 4, an action force applied by the first convex surface 801 to the elastic component of the first spring 307 is equivalent to the second action force F2, so that the elastic component of the first spring 307 generates elastic deformation. In addition, to recover from deformation, the elastic component of the first spring 307 also applies an action force whose magnitude is the same as that of the second action force F2 and whose direction is opposite to that of the second action force F2 to the first convex surface 801. In the second phase, because the gap between the first spring 307 and the first convex surface 801 becomes larger, the elastic component of the first spring 307 is pressed less hard and elastic deformation generated by the elastic component of the first spring 307 also becomes smaller, that is, the elastic component of the first spring 307 gradually recovers from the elastic deformation. In this case, an elastic force accumulated by the elastic component of the first spring 307 is gradually released, so that the upper substrate 301 is driven to slide towards the bottom. To be specific, in the second phase, the elastic force released by the first spring 307 may help the upper substrate 301 and the lower substrate 302 slide relative to each other in the sliding direction, and the user needs to apply only a relatively small downward force or even applies no force to the upper substrate 301, so that the upper substrate 301 can slide towards the bottom. When the second phase ends, as shown in (c) in FIG. 10, the first spring 307 on the first side 303 recovers from deformation and is fastened in the groove 505a.

In other words, when the upper substrate 301 and the lower substrate 302 slide relative to each other, the first spring 307 on the upper substrate 301 is first pressed to accumulate the elastic force when being in contact with the first convex surface 801 of the housing 501, and then release the elastic force to help the upper substrate 301 and the lower substrate 302 slide relative to each other, so that the user has a better sliding feel when sliding the upper substrate 301 or the lower substrate 302. In addition, no boost spring or limiting structure needs to be disposed between the upper substrate 301 and the lower substrate 302, so that a thickness of the entire sliding structure can be reduced to 1.2 mm or less than 1.2 mm.

It should be noted that, in the foregoing embodiment, an example in which the first spring 307 slides from the groove 504a to the groove 504b is used for description. It may be understood that a process in which the second spring 308 slides from the groove 505a to the groove 505b is similar to the foregoing process, and a process in which the first spring 307 and the second spring 308 slide from the bottom to the top is also similar to the foregoing process. Therefore, details are not described herein again.

In addition, in all the foregoing embodiments, an example in which the first spring 307 and the second spring 308 are disposed on the upper substrate 301 is used for description. It may be understood that the first spring 307 and the second spring 308 may be alternatively disposed on the lower substrate 302.

For example, a sliding slot may be disposed on each of the two sides of the lower substrate 302, and a slide may be disposed on each of two sides corresponding to the upper substrate 301. In this way, after the slides on the upper substrate 301 are separately inserted into the sliding slots on the lower substrate 302, the sliding slots and the slides cooperate with each other, so that the upper substrate 301 and the lower substrate 302 can slide relative to each other. Similar to FIG. 3A to FIG. 10, the first groove 304 and the second groove 306 may be separately disposed on the two sides of the lower substrate 302, the first spring 307 is disposed at an opening of the first groove 304, and the second spring 308 is disposed at an opening of the second groove 306.

In addition, the first limiting groove and the second limiting groove may be disposed on a housing 1001 (not shown in the figure) configured to fasten the upper substrate 301, so that the first spring 307 and the second spring 308 on the lower substrate 302 may cooperate with the housing 1001, to implement functions such as helping and limiting in a sliding process. A process in which the first spring 307 and the second spring 308 on the lower substrate 302 cooperate with the housing 1001 is similar to a process in which the first spring 307 and the second spring 308 on the upper substrate 301 cooperate with the housing 501 configured to fasten the lower substrate 302 in the foregoing embodiment. Therefore, details are not described herein again.

Figure 11:
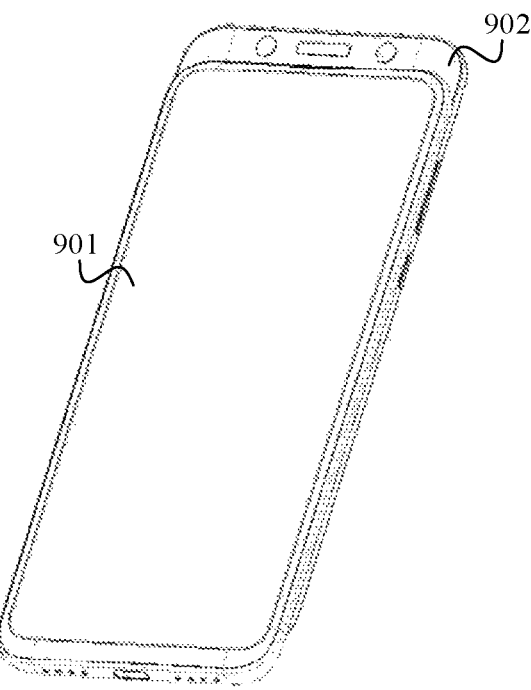
FIG. 11 is a sixth schematic structural diagram of a terminal according to an embodiment of this application.

Further, an embodiment of the present invention further provides a terminal including the foregoing sliding structure. As shown in FIG. 11, the terminal includes an upper sliding cover 901 and a lower sliding cover 902 that are disposed opposite to each other, and a sliding structure disposed between the upper sliding cover 901 and the lower sliding cover 902. The sliding structure may be the sliding structure described in the foregoing embodiments, and can help the upper sliding cover 901 and the lower sliding cover 902 slide relative to each other. The upper sliding cover 901 of the terminal is fastened to the upper substrate (for example, the upper substrate 301) in the sliding structure, and the lower sliding cover 902 of the terminal is fastened to the lower substrate (for example, the lower substrate 302) in the sliding structure.

When seen from a front panel of the terminal, the upper sliding cover 901 is located above the lower sliding cover 902. In an initial state, the upper sliding cover 901 and the lower sliding cover 902 overlap completely or partially. In a state of slidably opening, the upper sliding cover 901 and the lower sliding cover 902 are relatively far away from each other under the action of the sliding structure 903. An area of an overlapped part of the upper sliding cover 901 and the lower sliding cover 902 in this case is less than an overlapped area of the upper sliding cover 901 and the lower sliding cover 902 in the initial state.

The upper sliding cover 901 can slide downwards or upwards relative to the lower sliding cover 902. For example, in the initial state, the upper sliding cover 901 can slide downwards relative to the lower sliding cover 902. After the upper sliding cover 901 slides downwards, the terminal is in the state of slidably opening. In the state of slidably opening, the upper sliding cover 901 can slide upwards to restore the initial state. Alternatively, in the initial state, the upper sliding cover 901 can slide upwards relative to the lower sliding cover 902. After the upper sliding cover 901 slides upwards, the terminal is in the state of slidably opening. In the state of slidably opening, the upper sliding cover 901 can slide downwards to restore the initial state. Alternatively, in the initial state, the upper sliding cover 901 not only can slide upwards relative to the lower sliding cover 902, but also can slide downwards relative to the lower sliding cover 902, and can slide to restore the initial state.

Figure 12:
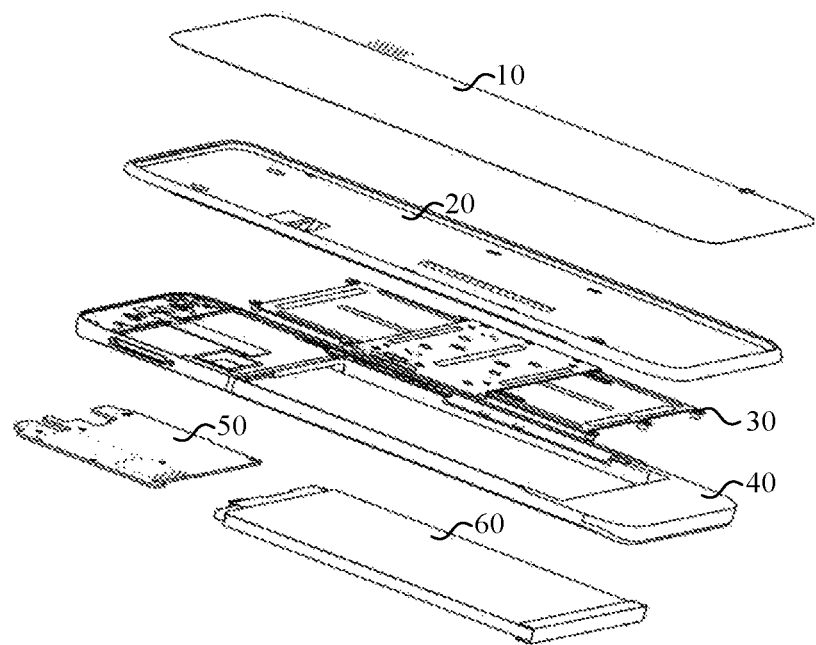
FIG. 12 is a seventh schematic structural diagram of a terminal according to an embodiment of this application.

For example, FIG. 12 is an exploded diagram of a structure of a terminal according to an embodiment of this application. As shown in FIG. 12, the terminal includes a display module 10, a front cover 20, a sliding structure 30, a rear cover 40, a mainboard 50, and a battery 60.

The display module 10 may include a display screen of the terminal. The display screen may be configured to display information entered by a user or information provided for a user, and various menus of the terminal. The display screen may include a display panel. Optionally, the display panel may be configured in a form of a liquid crystal display (liquid crystal display, LCD), an organic light-emitting diode (organic light-emitting diode, OLED), or the like. In the terminal having a touchscreen, the display module 10 may further include a touch panel, also referred to as a touchscreen. The touch panel may collect a touch operation performed by a user on or near the touch panel (for example, an operation performed by the user on or near the touchscreen by using any suitable object or accessory such as a finger or a stylus), and drive a corresponding connection apparatus according to a preset program. Optionally, the touch panel may include two parts: a touch detection apparatus and a touch controller. The touch detection apparatus detects a touch position of the user, detects a signal brought by a touch operation, and transmits the signal to the touch controller. The touch controller receives touch information from the touch detection apparatus, converts the touch information into touch point coordinates, and sends the touch point coordinates to a processor of the terminal, and can receive and execute a command sent by the processor. In addition, the touch panel may be implemented by using a plurality of types such as a resistive type, a capacitive type, an infrared type, and a surface acoustic wave type. Further, the touch panel may cover the display panel. After detecting a touch operation on or near the touch panel, the touch panel transmits the touch operation to the processor of the terminal to determine a type of a touch event, and then the processor provides a corresponding visual output on the display panel based on the type of the touch event. The touch panel and the display panel may be used as two independent components or integrated together to perform input and output functions of the terminal.

The display module 10 and the front cover 20 are fixedly assembled. Generally, a face of the display module 10 is a front face of the terminal. The rear cover is a rear face of the terminal.

The sliding structure 30 includes an upper substrate 301 and a lower substrate 302. The upper substrate 301 and the lower substrate 302 can slide relative to each other. For a specific structure and a sliding principle of the sliding structure 30, refer to related content in FIG. 3 to FIG. 9 in the foregoing embodiments. Therefore, details are not described herein again.

The upper substrate 301 and the front cover 20 are fixedly assembled. For example, the upper substrate 301 may be fastened to the front cover 20 by using a screw. After fastening, the front cover 20 and the display module 10 can slide along with the upper substrate 301.

The lower substrate 302 and the rear cover 40 are fixedly assembled. For example, the lower substrate 302 may be fastened to the rear cover 40 by using a screw. The rear cover 40, the mainboard 50, and the battery 60 are fixedly assembled. The rear cover 40, the mainboard 50, the battery 60, and a housing can slide along with the lower substrate 302. The mainboard 50 may be a circuit board on which a circuit element required by the terminal is mounted, for example, a printed circuit board (printed circuit board, PCB) on which an element is mounted.

It should be noted that, the components of the terminal shown in FIG. 12 are merely examples for description, and are merely used to describe a connection relationship between the sliding structure and another component of the terminal. A specific shape and structure of each component are not limited thereto provided that the upper sliding cover and the lower sliding cover can slide relative to each other by using the connection relationship in this embodiment. Each component may have another shape and structure. For example, a shape and a size of the display screen are not limited in the display module, and the mainboard and the battery may also have other shapes and structures.

In this embodiment, the upper sliding cover of the terminal may include the display module 10 and the front cover 20. The lower sliding cover of the terminal may include the rear cover 40. Further, the lower sliding cover may further include the mainboard 50, the battery 60, and the housing. The upper sliding cover and the lower sliding cover can slide relative to each other through the sliding structure.

In another embodiment, the upper sliding cover of the terminal may include the display module, the front cover, the mainboard, and the battery. The display module, the front cover, the mainboard, and the battery are fixedly connected to the upper substrate and slide along with the upper substrate. The lower sliding cover includes the rear cover, where the rear cover is fixedly connected to the lower substrate.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A terminal comprising:
a first sliding cover;
a second sliding cover disposed opposite to the first sliding cover and comprising a housing, wherein the housing comprises:
a first surface comprising two first limiting grooves disposed in a sliding direction, wherein the first surface is inward-facing; and
a second surface comprising two second limiting grooves disposed in the sliding direction and in a one-to-one correspondence with the two first limiting grooves, wherein the second surface is inward-facing; and
a sliding structure disposed between the first sliding cover and the second sliding cover, fastened to the housing, and disposed between the first surface and the second surface, wherein the sliding structure comprises:
a first substrate comprising:
a first side adjacent to the first surface;
a second side opposite to the first side and adjacent to the second surface,
wherein the first side and the second side are parallel to the sliding direction;
a first groove comprising a first opening; and
a second groove comprising a second opening;
a second substrate configured to slide relative to the first substrate in the sliding direction;
a first spring disposed at the first opening of the first groove; and
a second spring disposed at the second opening of the second groove.

2. The terminal of claim 1, wherein, when the first substrate and the second substrate slide relative to each other, the first spring is configured to be in contact with the first surface between the two first limiting grooves and configured to generate a first elastic deformation and the second spring is configured to be in contact with the second surface between the two second limiting grooves and configured to generate a second elastic deformation.

3. The terminal of claim 1, wherein the first spring comprises a first elastic component configured to generate a first elastic deformation when the first elastic component receives a first action force at the first side, and wherein the second spring comprises a second elastic component configured to generate a second elastic deformation when the second elastic component receives a second action force at the second side.

4. The terminal of claim 3, wherein the first elastic component is V-shaped, and wherein the second elastic component is V-shaped.

5. The terminal of claim 3, wherein the first elastic component is arc-shaped, and wherein the second elastic component is V-shaped.

6. The terminal of claim 3, wherein the first elastic component is V-shaped, and wherein the second elastic component is arc-shaped.

7. The terminal of claim 3, wherein the first elastic component is arc-shaped, and wherein the second elastic component is arc-shaped.

8. The terminal of claim 1, wherein a first shape of the two first limiting grooves corresponds to a second shape of the first spring.

9. The terminal of claim 1, wherein, in an initial state, the first spring is configured to fasten in one of the two first limiting grooves and the second spring is configured to fasten in one of the two second limiting grooves, and wherein, in response to the first substrate driving the first spring to slide out of the one of the two first limiting grooves and driving the second spring to slide out of the one of the two second limiting grooves, the first spring is configured to press against the first surface and to generate a first elastic deformation and the second spring is configured to press against the second surface and to generate a second elastic deformation such that the first substrate is fastened within the housing.

10. The terminal of claim 9, wherein, in response to the first substrate driving the first spring to slide into another of the two first limiting grooves and driving the second spring to slide into another of the two second limiting grooves, the first spring is configured to fasten in the other of the two first limiting grooves and configured to recover from the first elastic deformation and the second spring is configured to fasten in the other of the two second limiting grooves and configured to recover from the second elastic deformation.

11. The terminal of claim 1, wherein the housing further comprises:
a first convex surface between the two first limiting grooves; and
a second convex surface between the two second limiting grooves, wherein both the first convex surface and the second convex surface protrude toward the first substrate.

12. The terminal of claim 11, wherein the first convex surface is a first arc-shaped surface, and wherein the second convex surface is a second arc-shaped surface.

13. The terminal of claim 11, wherein the first convex surface comprises a first vertex located on a first perpendicular bisector between the two first limiting grooves, and wherein the second convex surface comprises a second vertex located on a second perpendicular bisector between the two second limiting grooves.

14. The terminal of claim 13, wherein the first substrate and the second substrate are configured to slide relative to each other over a first phase and a second phase, wherein during the first phase the first spring is configured to slide from one of the two first limiting grooves to the first vertex and the second spring is configured to slide from one of the two second limiting grooves to the second vertex, and wherein during the second phase the first spring is configured to slide from the first vertex to another of the two first limiting grooves and the second spring is configured to slide from the second vertex to another of the two second limiting grooves.

15. The terminal of claim 14, wherein during the first phase, an elastic deformation of the first spring is configured to increase when the first spring is in contact with the first convex surface and when the second spring is in contact with the second convex surface and a sliding resistance between the first substrate and the second substrate is configured to increase, and wherein during the second phase, the elastic deformation is configured to recover when the first spring is in contact with the first convex surface and when the second spring is in contact with the second convex surface and the first substrate and the second substrate are configured to slide relative to each other.

16. The terminal of claim 11, wherein the first convex surface is a V-shaped surface, and wherein the second convex surface is an arc-shaped surface.

17. The terminal of claim 11, wherein the first convex surface is an arc-shaped surface, and wherein the second convex surface is a V-shaped surface.

18. The terminal of claim 1, wherein a thickness of the sliding structure is less than 1.2 millimeters (mm).

19. The terminal of claim 1, wherein the first sliding cover is an upper sliding cover of the terminal, wherein the second sliding cover is a lower sliding cover of the terminal, wherein the first substrate is fastened to the upper sliding cover, and wherein the second substrate is fastened to the lower sliding cover.

20. The terminal of claim 1, wherein a first shape of the two second limiting grooves corresponds to a second shape of the second spring.

* * * * *